«(12) United States Patent
Yano et al.

(10) Patent No.: US 8,866,949 B2
(45) Date of Patent: Oct. 21, 2014

(54) OPTICAL ELEMENT MODULE AND MANUFACTURING METHOD THEREOF, ELECTRONIC ELEMENT MODULE AND MANUFACTURING METHOD THEREOF, AND ELECTRONIC INFORMATION DEVICE

(75) Inventors: Yuji Yano, Osaka (JP); Hideyuki Kurimoto, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 240 days.

(21) Appl. No.: 12/805,959

(22) Filed: Aug. 26, 2010

(65) Prior Publication Data
US 2011/0050978 A1 Mar. 3, 2011

(30) Foreign Application Priority Data

Aug. 28, 2009 (JP) ................. 2009-199015

(51) Int. Cl.
G02B 13/16 (2006.01)
B32B 37/12 (2006.01)
G02B 7/02 (2006.01)
G02B 13/00 (2006.01)
G02B 27/00 (2006.01)
B32B 38/00 (2006.01)

(52) U.S. Cl.
CPC ........... *B32B 37/12* (2013.01); *G02B 7/021* (2013.01); *G02B 7/022* (2013.01); *G02B 13/0085* (2013.01); *G02B 27/0018* (2013.01); *B32B 38/0004* (2013.01); *B32B 2310/0831* (2013.01); *B32B 2457/00* (2013.01); *B32B 2457/08* (2013.01)
USPC ......................................... 348/335; 348/294

(58) Field of Classification Search
USPC .......................................................... 348/335
See application file for complete search history.

(56) References Cited

U.S. PATENT DOCUMENTS

| | | | | |
|---|---|---|---|---|
| 6,813,103 B2 * | 11/2004 | Tansho et al. | ................. | 359/819 |
| 7,564,496 B2 * | 7/2009 | Wolterink et al. | ............ | 348/340 |
| 7,855,847 B2 * | 12/2010 | Kawasaki et al. | ............. | 359/830 |
| 2003/0184885 A1 * | 10/2003 | Tansho et al. | ................. | 359/819 |
| 2003/0193605 A1 * | 10/2003 | Yamaguchi | .................... | 348/335 |
| 2006/0171046 A1 * | 8/2006 | Recco et al. | .................... | 359/811 |
| 2009/0109330 A1 * | 4/2009 | Nakano et al. | ................. | 348/374 |
| 2009/0159200 A1 * | 6/2009 | Rossi et al. | .................... | 156/292 |
| 2009/0160998 A1 * | 6/2009 | Fukamachi et al. | .......... | 348/340 |
| 2009/0279191 A1 * | 11/2009 | Yu | ................................ | 359/819 |

(Continued)

FOREIGN PATENT DOCUMENTS

| | | |
|---|---|---|
| JP | 2002-189160 | 7/2002 |
| JP | 2004-246258 | 9/2004 |
| JP | 2004-254259 | 9/2004 |
| JP | 2006-235539 | 9/2006 |
| JP | 2007-333999 | 12/2007 |

(Continued)

*Primary Examiner* — Twyler Haskins
*Assistant Examiner* — Fayez Bhuiyan
(74) *Attorney, Agent, or Firm* — Edwards Wildman Palmer LLP; David G. Conlin; Steven M. Jensen

(57) ABSTRACT

An optical element module according to the present invention is provided, in which: a plurality of optical elements are housed within a light shielding holder; a metal light shielding plate is interposed at least between respective planarized surfaces of a spacer section of an upper optical element and a spacer section of a lower optical element; the light shielding plate includes an opening formed at a position corresponding to an optical surface of the optical element; and the light shielding plate includes a cut section, which is formed by cutting a part of a peripheral edge of the light shielding plate.

21 Claims, 11 Drawing Sheets

(56) References Cited

U.S. PATENT DOCUMENTS

| | | | |
|---|---|---|---|
| 2009/0305451 A1* | 12/2009 | Hsuan et al. | 438/65 |
| 2009/0316282 A1* | 12/2009 | Chang | 359/819 |
| 2010/0177238 A1* | 7/2010 | Saito | 348/374 |

FOREIGN PATENT DOCUMENTS

| | | |
|---|---|---|
| JP | 2009-098614 | 5/2009 |
| JP | 2009-139693 A | 6/2009 |
| JP | 2009-157279 | 7/2009 |

* cited by examiner

OPTICAL ELEMENT MODULE AND MANUFACTURING METHOD THEREOF, ELECTRONIC ELEMENT MODULE AND MANUFACTURING METHOD THEREOF, AND ELECTRONIC INFORMATION DEVICE

This nonprovisional application claims priority under 35 U.S.C. §119(a) to Patent Application No. 2009-199015 filed in Japan on Aug. 28, 2009, the entire contents of which are hereby incorporated by reference.

BACKGROUND OF THE INVENTION

1. Field of the Invention

The present invention relates to: an optical element module, such as a lens module and an optical function element module, in which one or a plurality of optical elements are housed within a light shielding holder, and a manufacturing method thereof; an electronic element module obtained by modularizing the optical element module and an electronic element, and a manufacturing method thereof; and an electronic information device, such as a digital camera (e.g., a digital video camera or a digital still camera), an image input camera (e.g., a monitoring camera), a scanner, a facsimile machine, a television telephone device and a camera-equipped cell phone device, including the electronic element module as an image input device used in an image capturing section thereof.

2. Description of the Related Art

In some conventional lens units used for a camera module or the like, concave and convex parts provided for adjacent lenses are engaged with each other to position a plurality of lenses in a lens tube.

FIG. 13 is a longitudinal cross sectional view of a conventional lens unit disclosed in Reference 1.

As illustrated in FIG. 13, a conventional lens unit 500 includes: a first lens 510; a second lens 520; a third lens 530; a back holding member 540; and a lens tube 550, within which the first to third lenses 510, 520 and 530 and the back holding member 540 are arranged. The lower side of the lens unit 500 is the side of a subject, while the upper side is the side for image capturing. From the subject side in the lens tube 550, there are the first lens 510, the second lens 520, the third lens 530 and the back holding member 540 arranged in said order. In addition, the periphery of the second lens 520, the third lens 530 and the back holding member 540 is fixed to the lens tube 550. On the contrary, the periphery of the first lens 510 is not fixed to the lens tube 550.

The first lens 510 includes: a lens portion 511 having an optical surface, and a flange portion 512 provided on the periphery side of the lens portion 511. There is also provided an annular convex portion 513 extending in an axis direction from the periphery side to the image capturing side of the flange portion 512.

The second lens 520 includes: a lens portion 521 having an optical surface; and a flange portion 522 provided on the periphery side of the lens portion 521. There is also provided an annular convex portion 523 extending in an axis direction from the periphery side to the image capturing side of the flange portion 522 described above.

The third lens 530 includes: a lens portion 531 having an optical surface; and a flange portion 532 provided on the periphery side of the lens portion 531.

The back holding member 540 includes: an annular base portion 541; a convex portion 542 provided in such a manner to protrude from an end surface on the subject side of the base portion 541 towards the subject side; and an annular step portion 543 provided in the periphery of an end surface on the image capturing side of the base portion 541. An adhesive or the like is filled into the annular step portion 543 to fix the back holding member 540 to the lens tube 550. The back holding member 540 also functions to shield unnecessary light.

The lens tube 550 includes: a cylinder portion 551; an annular positioning portion 552 provided at one end on the subject side of the cylinder portion 551 and extending towards the inside; and an annular receiving portion 553 provided on an inner end surface of the positioning portion 552 and protruding in an axis direction towards the inner side (image capturing side). The positioning portion 552 includes a circular hole 552a at a position facing the lens portion 511 of the first lens 510.

The lens unit 500 includes the third lens 530 fixed to the lens tube 550, other than the lens group consisting of the first and second lenses 510 and 520, so that it becomes possible to arrange a light shielding plate 570 between the lens group (first and second lenses 510 and 520), which are positioned with one another, and the third lens 530, which is fixed to the lens tube 550 other than the lens group.

The second lens 520 and the third lens 530 are not positioned between the lenses themselves, but the second lens 520 and the third lens 530 are fixed to the lens tube 550, and the periphery of the light shielding plate 570 between the second lens 520 and the third lens 530 extends to the inner circumference surface of the lens tube 550. Since the periphery of the light shielding plate 570 extends to the inner circumference surface of the lens tube 550, unnecessary light passing through the outer side (light which does not pass through the lens portion) can be shielded. This can improve the light shielding effect.

In addition, an annular light shielding plate 560 is arranged at least in a gap provided between the flange portion 512 of the first lens 510 and the flange portion 522 of the second lens 520, which lenses are positioned with one another. As a result, it becomes possible to maintain the light shielding effect, and even if there is a variation in the thickness of the light shielding plate 560, the lens space will not be affected.

Reference 1: Japanese Laid-Open Publication No. 2009-139693

SUMMARY OF THE INVENTION

In the conventional lens unit 500, however, the light shielding plate 570 is put between the second lens 520 and the third lens 530. Therefore, the variation in the thickness of the light shielding plate 570 will influence the space between the lenses. It may be possible to use a thin metal material, such as a stainless steel material, to make the thickness of the light shielding plate 570 thin to inhibit the variation in the thickness; however, in a case where such a light shielding plate is interposed between a plurality of lens wafers and the plurality of layers are laminated with one another to form a lens wafer module, and lens modules are individually formed by the simultaneous cutting of the lens wafer module, when a thin stainless steel plate material (SUS) is simultaneously cut by a dicing blade or a wire along a dicing line DL between adjacent optical surfaces A, some problems occur, such that the blade becomes dull and the cut surface becomes rough.

The present invention is intended to solve the conventional problems described above. The objective of the present invention is to provide: an optical element module, such as a lens unit, capable of controlling variation in a space between lenses to make optical characteristics favorable and allowing to be cut favorably during simultaneous cutting in a case where there is a light shielding plate interposed between the lenses, and a manufacturing method thereof; an electronic element module, such as a camera module, using the lens unit, and a manufacturing method thereof; and an electronic information device, such as a camera-equipped cell phone device, including the electronic element module as an image input device used in an image capturing section.

An optical element module according to the present invention is provided, in which: a plurality of optical elements are housed within a light shielding holder; a light shielding plate is interposed at least between respective planarized surfaces of a spacer section of an upper optical element and a spacer section of a lower optical element; the light shielding plate includes an opening formed at a position corresponding to an optical surface of the optical element; and the light shielding plate includes a cut section, which is formed by cutting a part of a peripheral edge of the light shielding plate, thereby achieving the objective described above.

Preferably, in an optical element module according to the present invention, the cut section is either provided at four sides of a quadrilateral in plan view excluding corner portions thereof, or formed at four corner portions thereof.

Still preferably, in an optical element module according to the present invention, the cut section at the four corner portions is either in a ¼ circular shape, or in an L shape along the corner portion.

Still preferably, in an optical element module according to the present invention, the light shielding plate is made of metal.

Still preferably, in an optical element module according to the present invention, a thickness of the light shielding plate is defined to be 100 µm at its maximum.

Still preferably, in an optical element module according to the present invention: a spacer section is provided on the outer circumference side of the optical surface of the optical element facing an aperture opening of the light shielding holder, with an annular slanting surface interposed from a planarized section; a planarized bottom surface is provided on an inner surface of a back side of the aperture opening of the light shielding holder, with an interposed slanting surface facing the slanting surface of the optical element; and the respective annular slanting surfaces of the optical element and the light shielding holder can be guided together.

Still preferably, in an optical element module according to the present invention, the annular slanting surface of the optical element and the annular slanting surface of the light shielding holder slant 30 to 80 degrees relative to the planarized surface.

Still preferably, in an optical element module according to the present invention, there is a gap of 30 µm to 100 µm between an inner surface of the light shielding holder and an outer surface of the one or plurality of optical elements, which are quadrilateral in plan view.

Still preferably, in an optical element module according to the present invention, the gap between the annular slanting surface of the optical element and the annular slanting surface of the light shielding holder is 20 µm at its maximum.

Still preferably, in an optical element module according to the present invention, an adhesive is arranged only in a space portion surrounded by bottom sections provided, with interposed taper sections, on a further outer circumference side of respective planarized surfaces of the spacer section on the outer circumference side of the optical surface on a back surface of the upper optical element, and a spacer section on the outer circumference side of the optical surface on a front surface of the lower optical element, so that the upper optical element and the lower optical element are adhered with each other.

Still preferably, in an optical element module according to the present invention: the adhesive is arranged only in the space portion surrounded by the bottom sections with the interposed taper sections; the adhesive is not arranged at least in a space portion surrounded by the upper and lower taper sections; and at least the space portion surrounded by the taper sections has enough space which prevents the adhesive from spreading to the spacer section by being pressed by the upper optical element and the lower optical element during adhesion.

Still preferably, in an optical element module according to the present invention, the adhesive is an ultraviolet ray (UV) curing resin or an ultraviolet ray (UV) curing and thermosetting resin.

Still preferably, in an optical element module according to the present invention, the optical surface, the slanting surface on the outer circumference side thereof, and the spacer section are simultaneously formed with a transparent resin material.

Still preferably, in an optical element module according to the present invention, the optical element is a lens.

Still preferably, in an optical element module according to the present invention, the optical element is an optical function element that directs output light straight to be output and refracting and guiding incident light in a predetermined direction.

A method for manufacturing an optical element module according to the present invention is provided for manufacturing the optical element module according to the present invention, the method including an assembling step, in which an optical element module is inserted into an open side of the light shielding holder, from the side close to the upper most optical element of the optical element module, and owing to a weight of the optical element module itself, a slanting surface of the upper most optical element and a slanting surface on an inner side of an aperture opening of the light shielding holder are guided together, so that the aperture opening of the light shielding holder and the optical surface of the optical element are positioned, thereby achieving the objective described above.

Preferably, in a method for manufacturing an optical element module according to the present invention, the method further includes, preceding prior to the assembling step: a combining step for combing, by an adhesive, an upper lens wafer with a plurality of optical surfaces arranged thereon two dimensionally and a lower lens wafer with a plurality of optical surfaces arranged thereon in two dimensionally, with a light shielding plate wafer interposed therebetween, in such a manner that optical axes of the upper and lower optical surfaces correspond to openings of the light shielding plate wafer, to manufacture an optical element wafer module; a UV light emitting step of emitting UV light onto the adhesive to cure the adhesive; and a cutting step of cutting the optical element wafer module simultaneously along dicing lines into individualized optical element modules.

An electronic element module according to the present invention is provided, in which an image capturing element chip module is fixed in a light shielding holder of the optical element module according to the present invention, the image capturing element chip module including a transparent support substrate adhered and fixed thereto to cover an electronic element facing the optical surface of the optical element, and the image capturing element chip module being adhered by positioning the electronic element relative to the optical surface, thereby achieving the objective described above.

A method for manufacturing an electronic element module according to the present invention is provided, the method including: an optical element module assembling step using the method for manufacturing an optical element module according to the present invention; and an electronic element chip module assembling step of fixing an electronic element chip module including a transparent support substrate adhered and fixed thereto for covering the electronic element facing the optical surface of the optical element, within the light shielding holder by positioning the electronic element relative to the optical surface, thereby achieving the objective described above.

An electronic information device according to the present invention includes an electronic element module, as a sensor module, in an image capturing section thereof, the electronic element module including the optical element module according to the present invention provided therefor, thereby achieving the objective described above.

An electronic information device according to the present invention includes an electronic element module in an information recording and reproducing section thereof, the electronic element module including the optical element module according to the present invention provided therefor, thereby achieving the objective described above.

The functions of the present invention having the structures described above will be described hereinafter.

In the present invention, a plurality of optical elements are housed within a light shielding holder, and a metal light shielding plate is interposed at least between respective planarized surfaces of a spacer section of an upper optical element and a spacer section of a lower optical element. The metal light shielding plate includes an opening formed at a position corresponding to an optical surface of the optical element, and also includes a cut section, which is formed by cutting off a part of a peripheral edge of the light shielding plate.

As a result, in a case where there is a light shielding plate interposed between the lenses, the light shielding plate can be formed thinner since it is made of metal. This allows to inhibit the variation in a space between the lenses more favorably, and obtain more favorable optical characteristics. In addition, since the cut section is included, which is formed by cutting off a part of the peripheral edge of the light shielding plate, the cutting area becomes less. This allows more favorable cutting during simultaneous cutting.

In addition, the peripheral section of the light shielding plate is formed not to reach the peripheral end of the upper optical element and the lower optical element, and a gap is created by the cut section. As a result, the light shielding plate does not shield UV light to the adhesive, which makes it possible to avoid the lenses from being deformed due to the difference in the degree of extension of the upper and lower lenses during conventional heat processing. This allows the dimensional stability of the overall lens module to be favorable.

According to the present invention as described above, when there is a light shielding plate interposed between lenses, the light shielding plate is made of metal and therefore it can be made thinner. As a result, it becomes possible to control the variation in space between the lenses and obtain favorable optical characteristics. Further, a cut section is included, which is formed by cutting off a part of a peripheral edge of the light shielding plate. This makes the cutting area to be less and more favorable cutting can be performed during simultaneous cutting.

In addition, the peripheral section of the light shielding plate is formed not to reach the peripheral end of the upper optical element and the lower optical element, and a gap is created by the cut section. As a result, the light shielding plate does not shield UV light to the adhesive, which makes it possible to avoid the lenses from being deformed due to the difference in the degree of extension of the upper and lower lenses during conventional heat processing. This allows the dimensional stability of the overall lens module to be favorable.

These and other advantages of the present invention will become apparent to those skilled in the art upon reading and understanding the following detailed description with reference to the accompanying figures.

BRIEF DESCRIPTION OF THE DRAWINGS

FIG. 9(*c*) is an enlarged view of a rectangular hole in FIG. 9(*a*), and FIG. 9(*d*) is an enlarged view of a cross shape hole in FIG. 9(*b*).

FIG. 10(f) is an essential part cross sectional view of a joint surface in a case where the light shielding plate is directly put between a glass plate and the first lens.

FIG. 11(a) is an essential part cross sectional view of a lens joint surface of a case where a light shielding plate is not used, FIG. 11(b) is a plan view thereof, FIG. 11(c) is an essential part cross sectional view of a lens joint surface of a case where the light shielding plate is used, and FIG. 11(d) is a plan view thereof.

Figure 1:
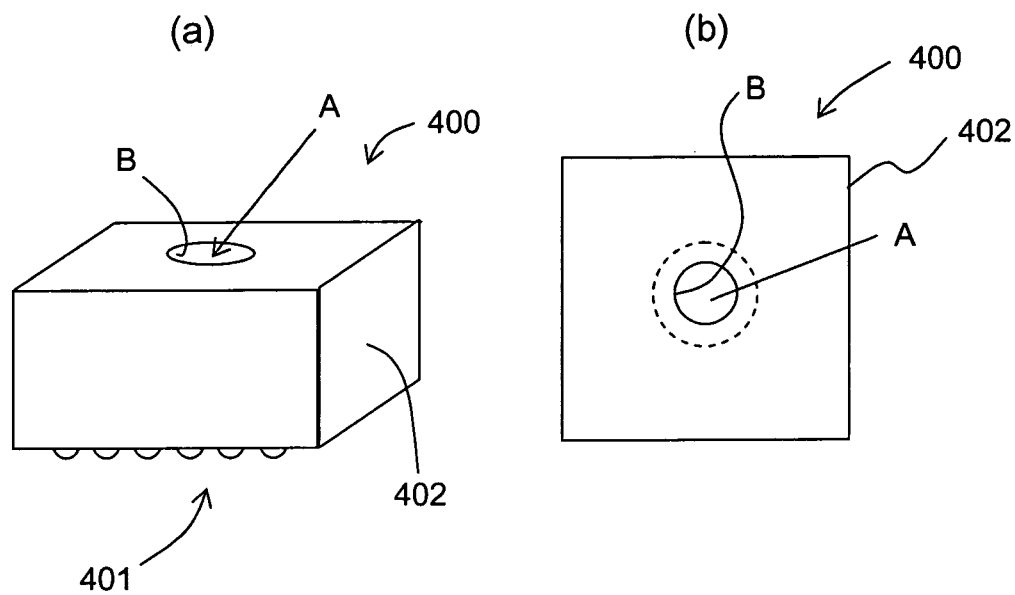
FIG. 1 is a schematic external view of an electronic element module according to Embodiment 1, where FIG. 1(*a*) is a perspective view and FIG. 1(*b*) is a top view of the electronic element module.

400 image capturing element module
401 image capturing element chip (electronic element chip)
402 light shielding holder
402B, 406B slanting surface
403 image capturing element
404 resin adhesive layer
405 transparent support substrate
406 first lens
406A planarized surface
406C, 406D, 407D spacer section
406E, 407E bottom surface section (bottom section)
407 second lens
408 lens module
409 adhesive
409A vent hole
410, 410A to 410C, 410E light shielding plate
411a lens opening (through hole)
411b rectangular hole (rectangular shape hole)
411c cross shape hole
411d L shape hole
411e cut section
411, 411A, 411B light shielding plate wafer
412 image capturing element chip module
416 first lens wafer
417 second lens wafer
418 lens wafer module
420, 421 spacer section
A optical surface
B aperture opening
G contacting section
H adhesive section
90 electronic information device
91 solid-state image capturing apparatus
92 memory section
93 display section
94 communication section
95 image output section

DESCRIPTION OF THE PREFERRED EMBODIMENTS

Hereinafter, cases will be described in detail with reference to the accompanying figures as Embodiment 1, where an optical element module and a manufacturing method thereof, and an electronic element module using the optical element module and a manufacturing method thereof according to the present invention are applied to a lens module and a manufacturing method thereof and a sensor module using the lens module and a manufacturing method thereof. Further, an electronic information device, such as a camera-equipped cell phone device, including the sensor module as an image input device used in an image capturing section will be described in detail with reference to the accompanying figures as Embodiment 2.

Embodiment 1

FIG. 1 is a schematic external view of an electronic element module 400 according to Embodiment 1, where FIG. 1(a) is a perspective view and FIG. 1(b) is a top view of the electronic element module 400.

As illustrated in FIGS. 1(a) and 1(b), the electronic element module 400 (sensor module 10) as the electronic element module according to Embodiment 1 includes: an optical element or an optical element module (not shown), such as one or a plurality of lenses, in which an optical surface A is provided at the center portion; and an image capturing element chip 401. The optical element or optical element module and the image capturing element chip 401 are housed within a light shielding holder 402 such that an optical surface A corresponds and aligns with an aperture opening B. By the light shielding holder 402, the top and side surfaces are covered, except the optical surface A, to shield the surface of the image capturing element from light. A plurality of the electronic element modules 400 are cut simultaneously from an image capturing element wafer module, and therefore, the external shape of each of the electronic element modules 400 is a quadrilateral in a plan view as illustrated in FIG. 1(b).

Figure 2:
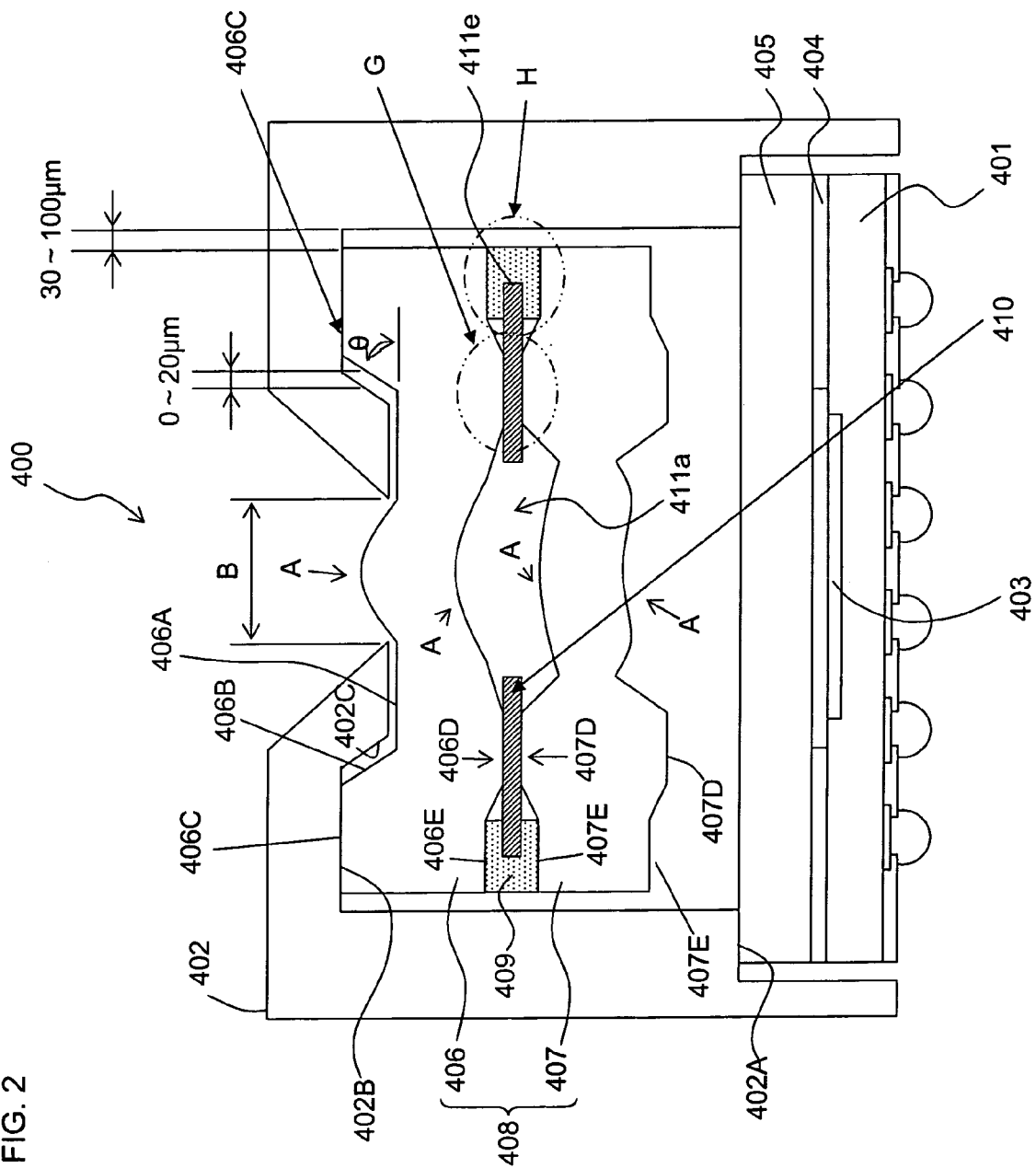
FIG. 2 is a longitudinal cross sectional view illustrating an exemplary detailed structure of the electronic element module according to Embodiment 1.

FIG. 2 is a longitudinal cross sectional view illustrating an exemplary detailed structure of the electronic element module 400 according to Embodiment 1.

Figure 13:
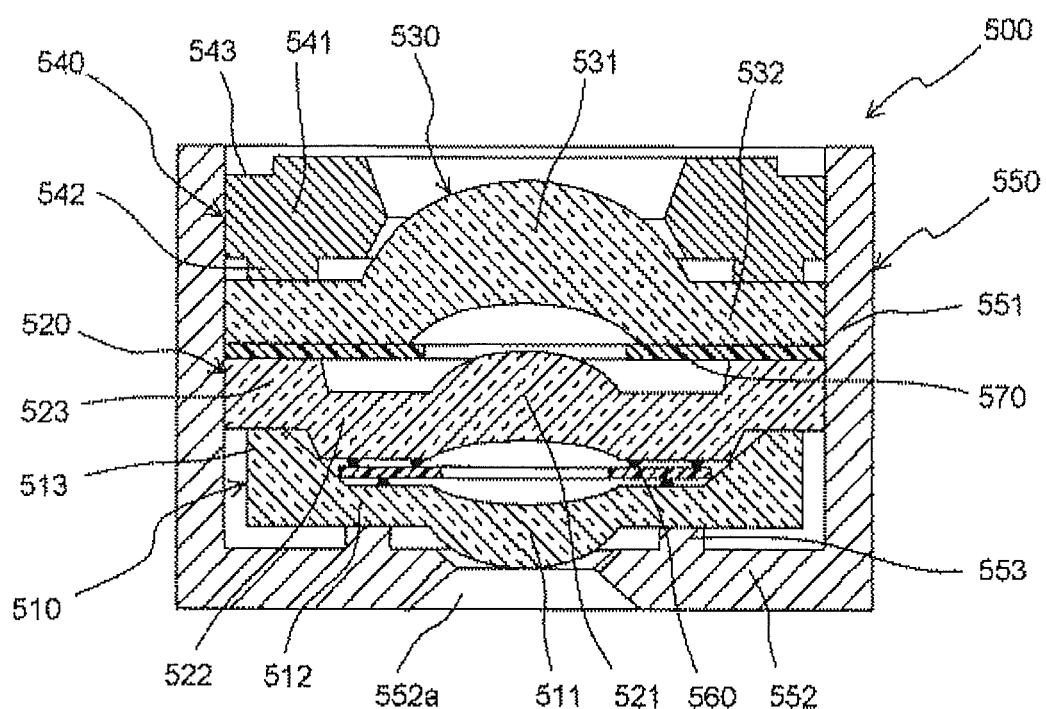
FIG. 13 is a longitudinal cross sectional view of a conventional lens unit disclosed in Reference 1.

As illustrated in FIG. 2, the electronic element module 400 according to Embodiment 1 includes: an image capturing element chip 401 as an electronic element, in which an image capturing element 403 is arranged at the center portion, the image capturing element 403 having a plurality of light receiving sections for capturing an image of a subject; a resin adhesive layer 404 arranged in the periphery of the image capturing element 403 on the image capturing element chip 401; a transparent support substrate 405, such as a glass plate, covering the image capturing element 403 and being adhered on and fixed to the resin adhesive layer 404; and a lens module 408, as an optical element module including a first lens 406 and a second lens 407, provided above the transparent support substrate 405 in such a manner that the respective lens positions (position of respective optical surfaces A) correspond to align with the image capturing element 403. The electronic element module 400 further includes a light shielding holder 402. The light shielding holder 402 arranges the image capturing element chip 401, the resin adhesive layer 404 and the transparent support substrate 405 below a step section 402A, and arranges the lens module 408 below a bottom surface section 402B, to shield external light except for image capturing light. FIG. 2 illustrates one unitary lens module 408 of a lens wafer module. As will be detailed later, the unitary lens module 408 is in fact made such that the lens wafer module is cut into a large number of individualized lens modules 408. The lens module 408 is housed within the light shielding holder 402 and an individualized electronic element (i.e., an image capturing element chip module 412, which will be described later with reference to FIG. 5) is arranged on the step section 402A within the light shielding holder 402, to manufacture the electronic element module 400 (i.e., a sensor module 10, which will be described with reference to FIG. 13).

Figure 3:
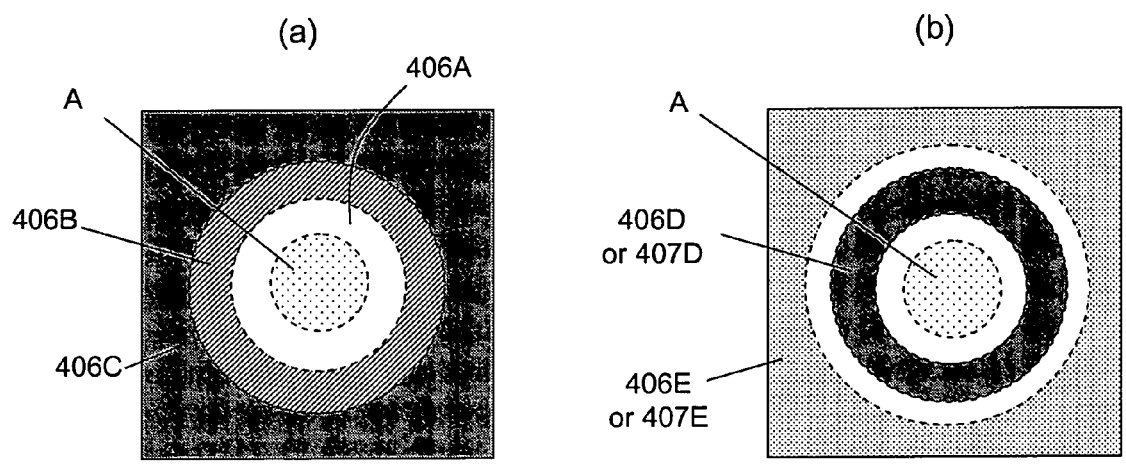
FIG. 3(*a*) is a plan view illustrating a front surface of the first lens in FIG. 2, and FIG. 3(*b*) is a plan view illustrating a back surface of the first lens and front and back surfaces of a second lens in FIG. 2.

As illustrated in FIG. 3(*a*), the front surface of the first lens 406 of the lens module 408 includes a planarized spacer section 406C (a planarized section or a protruded section), which is annularly protruded to surround the optical surface A, with an outer circumference end portion, a planarized surface 406A and a slanting surface 406B interposed therebetween. In addition, as illustrated in FIG. 3(*b*), the back surface of the first lens 406 is provided with a bottom section 406E (or a bottom surface section) for arranging an adhesive thereon, on a further outer circumference side of a planarized spacer section 406D (protruded section), which is annularly protruded surrounding the optical surface A of the center portion, with a step section (a slanting surface or a tapered surface) interposed therebetween. In this case together with the back surface shape of the first lens 406, the front surface shape of the first lens 406, such as the optical surface A, the slanting surface 406B on the outer circumference side thereof, and the spacer section 406C, are simultaneously formed with a transparent resin material.

As illustrated in FIG. 3(*b*), both the front surface and the back surface of the second lens 407 are provided with a bottom section 407E (or a bottom surface section) for arranging an adhesive thereon, on a further outer circumference side of a planarized spacer section 407D (protruded section), which is annularly protruded surrounding an optical surface A of a center portion thereof, with a step section (a slanting section) interposed therebetween.

An adhesive 409 is arranged in a space portion surrounded by the bottom surface sections 406E and 407E, which are on the further outer circumference side of the respective planarized surfaces of the spacer section 406D on the underside of the upper first lens 406 and the spacer section 407D on the upper side of the lower second lens 407. Thus, the first lens 406 and the second lens 407 are adhered with each other. In this case, a UV curing resin is used for the adhesive 409.

The annular slanting surface 406B of the first lens 406, and the annular slanting surface 402C inside an aperture opening B of the light shielding holder 402 are guided together, so that the upper spacer section 406C and slanting surface 406B of the first lens 406 are engaged with the slanting surface 402C of the light shielding holder 402. In order to facilitate to house the lens module 408 into the light shielding holder 402 during the assembly, there is a gap of 30 μm to 100 μm between the inner surface of the light shielding holder 402 and the external side surface of the lens module 408. There is also a gap of 0 μm to 20 μm between the slanting surface 406B of the first lens 406 and the slanting surface 402C on the inner side of the light shielding holder 402. The engaging angle θ of the slanting surface 406B is approximately between 30 and 80 degrees, and preferably approximately between 45 to 60 degrees. Thus, the positional accuracy between the optical surface A of the first lens 406 and the aperture opening B of the light shielding holder 402 becomes as highly accurate as ±10 μm.

A light shielding plate 410 is interposed between the spacer section 406D on the underside of the upper first lens 406 and the spacer section 407D on the upper side of the lower second lens 407. The light shielding plate 410 includes a through hole formed at the center portion to correspond to the optical surface. In addition, black dyed stainless steel (SUS), black PET or a PI substrate with black metal sputtered or deposited on its surface may be used for the light shielding plate 410. The black dyed light shielding plate of stainless steel can be formed as thin as 100 μm or less in thickness, which reduces the variation in size in the thickness direction. For example, when a stainless steel light shielding plate with the thickness of 20 μm is used, the thickness variation will be approximately ±2 μm, which is a variation within an optically acceptable range. The light shielding plate 410 is directly put between the spacer section 406D and the spacer section 407D, and the light shielding plate 410 is also thin, which causes almost no variation in the thickness direction of the lens module 408 and causes little optical influence.

As described above and as illustrated in a circle contacting section G in FIG. 2, the lens space between the first lens 406 and the second lens 407 as well as the thickness of the lens module 408 are controlled by the contact of the respective planarized surfaces of the annular protruded portions of the spacer sections 406D and 407D. That is, the lens space is determined by the contacting surfaces (spacer sections 406D and 407D) of the first lens 406 and the second lens 407 and the thickness of the light shielding plate 410. The adhesive 409 is arranged in the space portion (gap portion) surrounded by the bottom surface sections 406E and 407E, which are on the further outer side of the contacting surfaces, and the first lens 406 and the second lens 407 are adhered by the adhesive 409. As a result, even if a large amount of the adhesive 409 is provided, the adhesive 409 will spread only within the gap, thereby no harmful influence is made depending on the variation of the thickness or amount of the adhesive 409. As a result, the lens space is stabilized, and the optical characteristics of the lens module 408 are also stabilized. In this case as well, a later-described vent hole 409A can be provided in the adhesive 409, which is arranged in the periphery of the optical surface A, to prevent the adhesive 409 from being peeled off during the reflow.

As illustrated by an adhesive section H in the circle of FIG. 2, the light shielding plate 410, which is a quadrilateral (or a disc) shape in plan view, includes a cut section 411*e*, which is formed by cutting off part of the outer circumference portion of the light shielding plate 410. The cut section 411*e* does not reach as far as the outer circumference end of the first lens 406 or the second lens 407, and creates a gap. The reason why the cut section 411*e* is provided is first to prevent the light shielding plate 410 from shielding UV light to the adhesive 409 so that a UV light curing resin can be used for the adhesive 409, and second to reduce the area to be cut in the light shielding plate 410. If a thermosetting resin is used for the adhesive 409, there is a possibility of the lenses to be deformed due to the difference in the extension between the upper and lower lenses during the heat treatment. If a UV light curing resin is used for the adhesive 409, the adhesive 409 can be cured by UV light at a low temperature, which provides the dimensional stability of the overall lens module 408.

If a stainless steel plate material (SUS), for example, is used for the light shielding plate 410 and it is cut using a dicing blade or a wire, the edge of the blade becomes dull and the cutting surface becomes rough. Therefore, it is desirable to reduce the cutting area as much as possible. In order to reduce the area to be cut in the light shielding plate 410, cut guiding holes are provided. For example, in order to facilitate the simultaneous cutting, a case where each cut guiding hole is a rectangular hole is illustrated in FIG. 7(*a*), and a case where the cut guiding holes include a cross shape hole and an L shape hole is illustrated in FIG. 7(*b*).

Hereinafter, a first lens wafer, a light shielding plate wafer and a second lens wafer will be described, and a dicing line DL will also be described using the light shielding plate wafer.

Figure 6:
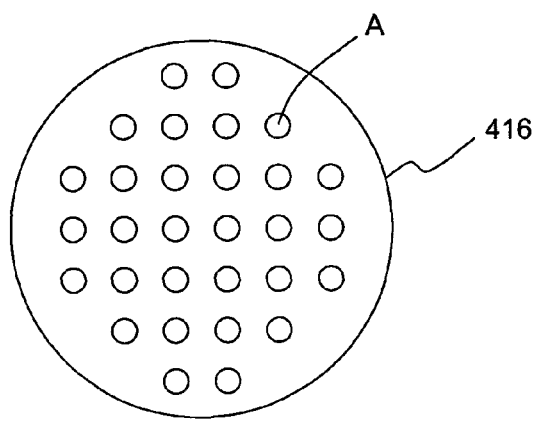
FIG. 6 is a plan view illustrating an example of a first lens wafer.

FIG. 6 is a plan view illustrating an example of a first lens wafer 416. In FIG. 6, a plurality of optical surfaces A are arranged equally both lengthwise and widthwise in the first lens wafer 416. In practice, a greater number of the optical surfaces A are arranged in a matrix.

Figure 7:
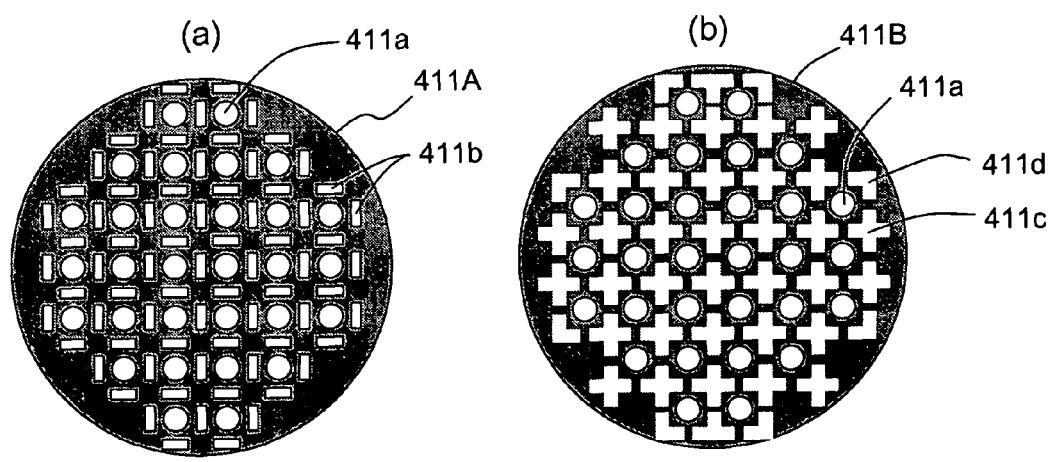
FIG. 7 is a plan view illustrating an example of a light shielding plate wafer, where FIG. 7(*a*) is a view illustrating a case where a cut guiding hole is a rectangular hole, and FIG. 7(*b*) is a view illustrating a case where a cut guiding hole includes a cross shape hole and an L shape hole.
Figure 9:
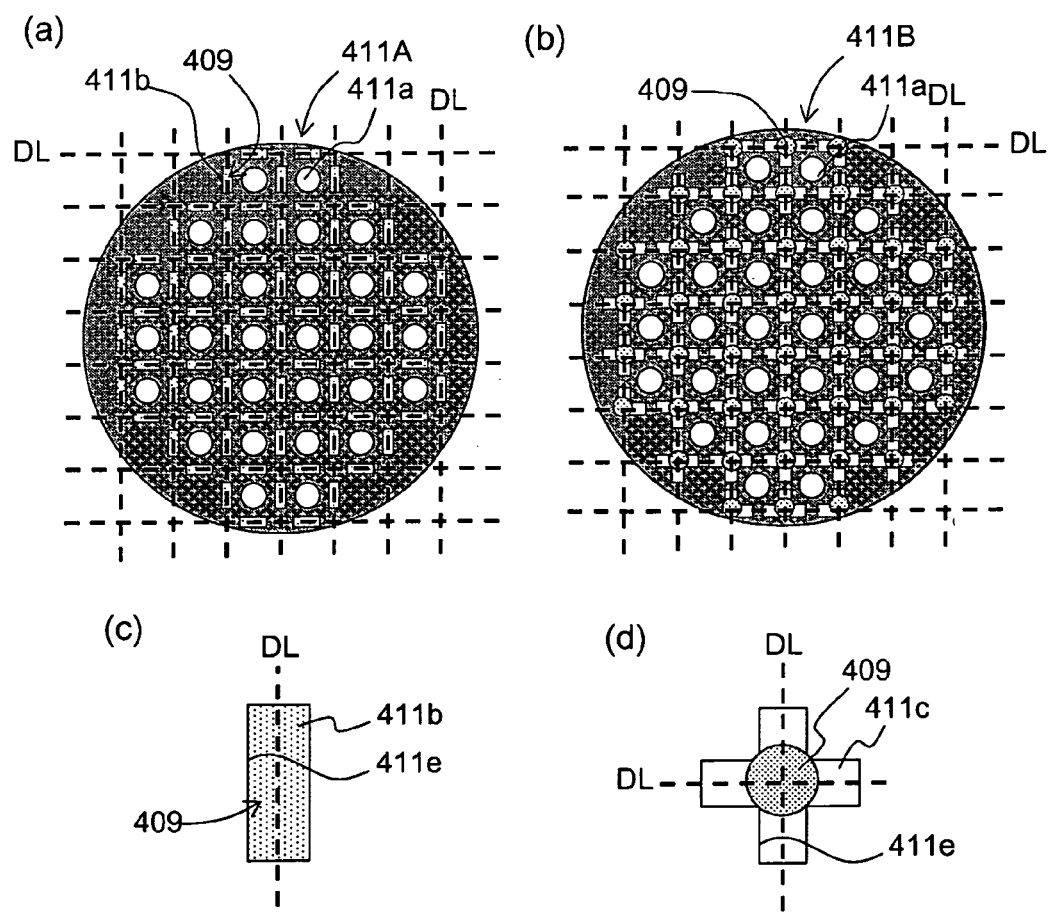
FIGS. 9(*a*) and 9(*b*) are each a plan view illustrating a positional relationship between a cut guiding hole and a dicing line DL, for facilitating simultaneous cutting in a light shielding plate wafer in FIG. 7.

FIG. 7 is a plan view illustrating an example of a light shielding plate wafer 411, where FIG. 7(a) is a view illustrating a case where the cut guiding hole is a rectangular hole, and FIG. 7(b) is a view illustrating a case where the cut guiding hole include a cross shape hole and an L shape hole. In FIGS. 7(a) and 7(b), a plurality of lens openings 411a are arranged equally both lengthwise and widthwise. In practice, a greater number of the lens openings 411a are arranged in a matrix. The lens openings 411a are formed as many as the number of the optical surfaces A, corresponding to the position of the optical surfaces A in FIG. 6. In the periphery of the lens openings 411a and between the adjacent lens openings 411a, rectangular holes 411b in FIG. 7(a) or cross shape holes 411c and L shape holes 411d in FIG. 7(b) are formed, as cut guiding holes to facilitate the simultaneous cutting. FIG. 9(a) and FIG. 9(b) respectively correspond to FIG. 7(a) and FIG. 7(b).

Figure 8:
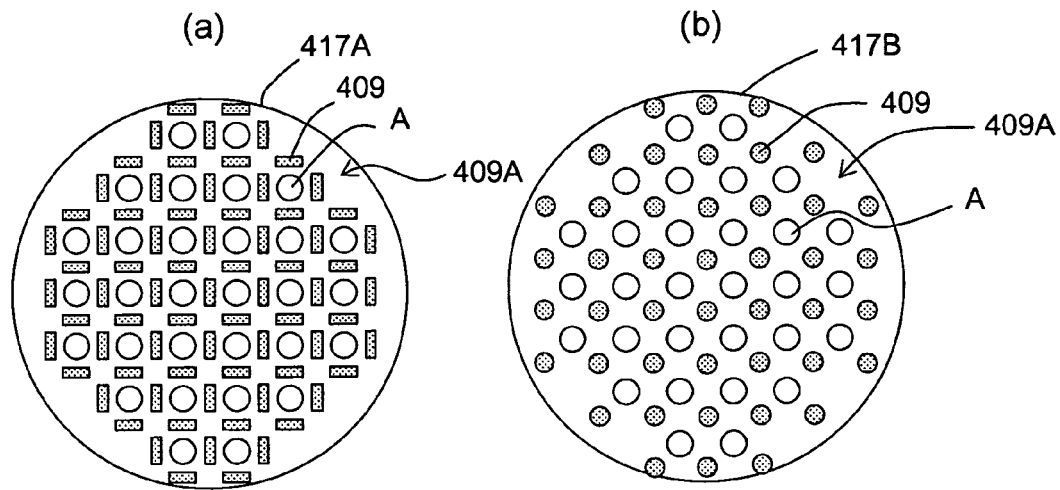
FIG. 8 is a plan view illustrating an example of a second lens wafer, where FIG. 8(*a*) illustrates a state where an adhesive is applied in accordance with a cut guiding hole of a light shielding plate wafer being a rectangular hole, and FIG. 8(*b*) illustrates a state where the adhesive is applied in accordance with the cut guiding hole of a light shielding plate wafer being a cross shape hole and an L shape hole.

FIG. 8 is a plan view illustrating an example of a second lens wafer 417, where FIG. 8(a) is a plan view of a second lens wafer 417A, illustrating a state where the adhesive 409 is applied in accordance with the cut guiding holes of a light shielding plate wafer 411A being a rectangular hole, and FIG. 8(b) is a plan view of a second lens wafer 417B, illustrating a state where the adhesive 409 is applied in a circular shape in accordance with the cut guiding holes of a light shielding plate wafer 411B being a cross shape hole, a T shape hole and an L shape hole.

FIGS. 9(a) and 9(b) respectively illustrate the positional relationship between the cut guiding holes for facilitating the simultaneous cutting and the dicing lines DL, in each light shielding plate wafer in FIGS. 7(a) and 7(b). FIG. 9(c) is an enlarged view of a rectangular hole 411b in FIG. 9(a). FIG. 9(d) is an enlarged view of a cross shape hole 411c in FIG. 9(b).

In FIGS. 9(a) and 9(c), when the light shielding plate wafer 411A is laid on top of the second lens wafer 417A, the position of the rectangular holes 411b corresponds to that of the adhesives 409. The rectangular hole 411b, which is a cut guiding hole, is cut along the widthwise center line, or the dicing line DL, to be a cut section 411e. In FIGS. 9(b) and 9(d), when the light shielding plate wafer 411B is laid on top of the second lens wafer 417B, the position of the center portion of the cross shape hole 411c, for example, corresponds to that of the circular shape adhesive 409. The cross shape hole 411c, which is a cut guiding hole, is cut along the widthwise center line, or the dicing line DL, to be an L shape cut section 411e along a corner portion.

Accordingly, the individualized light shielding plate 410 is provided with the lens opening 411a at the position corresponding to the respective optical surfaces A of the first lens 406 and the second lens 407. The individualized light shielding plate 410 also includes the cut section 411e, which is obtained by cutting off part of the outer circumference edge of the light shielding plate 410. The cut section 411e is either formed at the four sides of the quadrilateral in a plan view, excluding the corner portions, or formed at the four corner portions. The cut section 411e at the four corner portions is either in a ¼ circular shape, which is a remainder of the circular hole after being cut crosswise as previously described, or in an L shape along a corner portion, which is a remainder of the cross shape hole, T shape hole and L shape hole after being cut.

Next, a case will be described where the first lens wafer 416, the light shielding plate wafer 411, and the second lens wafer 417 are modularized to manufacture a lens wafer module 418 to be described later, with reference to FIGS. 4(a) to 4(c).

Figure 4:
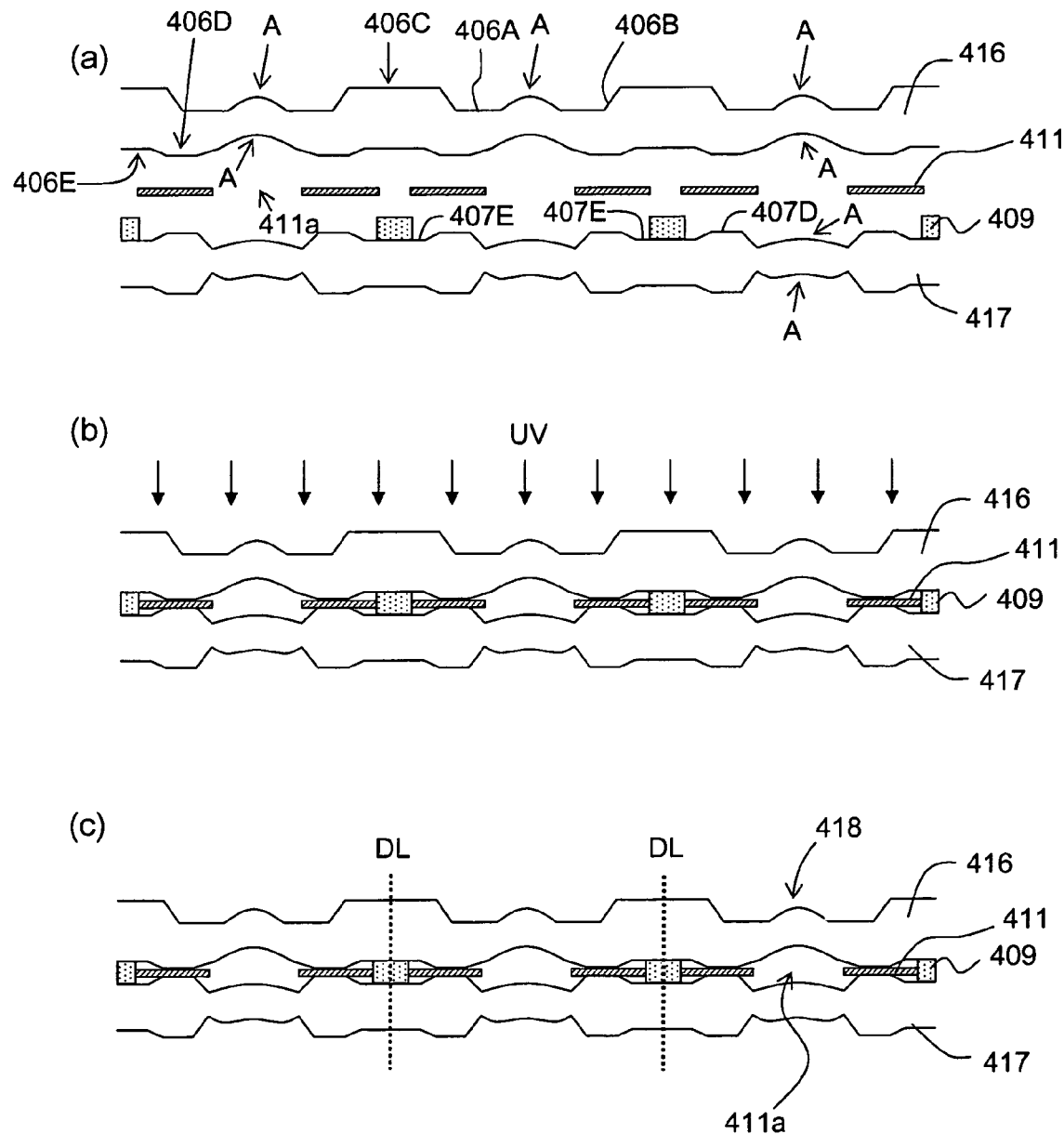
FIGS. 4(*a*) to 4(*c*) are each an essential part longitudinal cross sectional view illustrating each manufacturing step for modularizing a first lens wafer and a second lens wafer to manufacture a lens wafer module.

FIGS. 4(a) to 4(c) are each an essential part longitudinal cross sectional view illustrating each manufacturing step in a case where the first lens wafer 416 and the second lens wafer 417 are modularized to manufacture the lens wafer module 418.

First, in an adhesive applying step in FIG. 4(a), the adhesive 409 is applied, through a nozzle of a dispenser, on the bottom section 407E along dicing lines DL in a grid form, of the second lens wafer 417 (see FIG. 9), as illustrated in FIGS. 8(a) and 8(b). The second lens wafer 417 includes a plurality of second lenses 407 having the optical surfaces A arranged in a matrix therein. At this stage, as illustrated in FIG. 8(a), the adhesive 409 may be arranged in a rectangular shape at the four peripheral sides excluding the four peripheral corners (vent hole 409A) of the optical surface A. In this case, the four peripheral corner portions of the optical surface A become the vent holes 409A.

As illustrated in FIG. 8(b), the adhesive 409 may also be arranged in a quadrilateral or circular shape at only the four peripheral corners of the optical surface A. In this case, the four peripheral sides of the optical surface A become the vent holes 409A.

In this embodiment, the adhesive 409 is applied on the bottom section 407E between the second lenses 407 on the surface of the second lens wafer 417; however, without the limitation to this, the adhesive 409 may be applied on the bottom section 406E between the first lenses 406 on the back surface of the first lens wafer 416. Alternatively, the adhesive 409 may be applied on a predetermined position of the light shielding plate wafer 411. The predetermined position of the light shielding plate wafer 411 is the position of the cut guiding hole corresponding to the bottom section 406E and the bottom section 407E.

Next, in a combining step in FIG. 4(b), each optical axis of the optical surface A of each first lens 406 of the first lens wafer 416 is aligned to correspond with each optical axis of the optical surface A of each second lens 407 of the second lens wafer 417. Further, each center of the lens opening 411a of the light shielding plate wafer 411 is aligned to correspond with each optical axis of the optical surface A. Subsequently, the upper first lens wafer 416 and the lower second lens wafer 417, which are formed in a wafer scale, are combined with the adhesive 409 and the light shielding plate wafer 411 interposed therebetween to make them modularized. Thereafter, ultraviolet rays (UV) are emitted from above the wafer to cure the adhesive 409. In this case, although the light shielding plate wafer 411 is adhered by the adhesive 409, the light shielding plate wafer 411 need not be adhered by the adhesive 409, being separated from the adhesive 409, as will be described later in detail.

As described above, it is preferred to use a UV curing resin for the adhesive 409. The reason is that if a thermosetting resin is used for the adhesive 409, there will be a difference in the extension between the first lens wafer 416 and the second lens wafer 417 during the heat treatment and the positions of the upper and lower, first and second lenses 406 and 407 may be shifted from each other. It is noted that a resin which is cured by either of UV light or heat is effective as the adhesive 409. In this case, the resin portion hidden by the light shielding plate wafer 411 can be cured by heat. Therefore, when the position of the upper and lower, first and second lenses 406 and 407 is fixed first by the UV resin curing and the subsequent heat treatment is performed, it will be difficult for the positions of the upper and lower, first and second lenses 406 and 407 to be shifted.

Subsequently, as illustrated in a cutting step in FIG. 4(c), a cut retaining tape (not shown) is adhered on the front surface side of the plurality of first lenses 406 of the first lens wafer 416, or on the back surface side of the plurality of second lenses 407 of the second lens wafer 417, of a wafer scale. A cut protecting tape (not shown) may also be adhered on the opposite surface side of the cut retaining tape. Further, the lens wafer module 418 is simultaneously cut along the dicing lines DL indicated by the dotted lines to be individualized into the lens modules 408.

A wafer-formed transparent support substrate (a substrate prior to being individualized into each transparent support substrate 405), such as a glass plate, is adhered and fixed by the resin adhesive layer 404 to cover the upper part of the image capturing element wafer 401, and an image capturing element wafer unit is manufactured. The image capturing element wafer unit is simultaneously cut along the dicing lines DL to be individualized into image capturing element chip modules 412 in FIG. 5.

Figure 5:
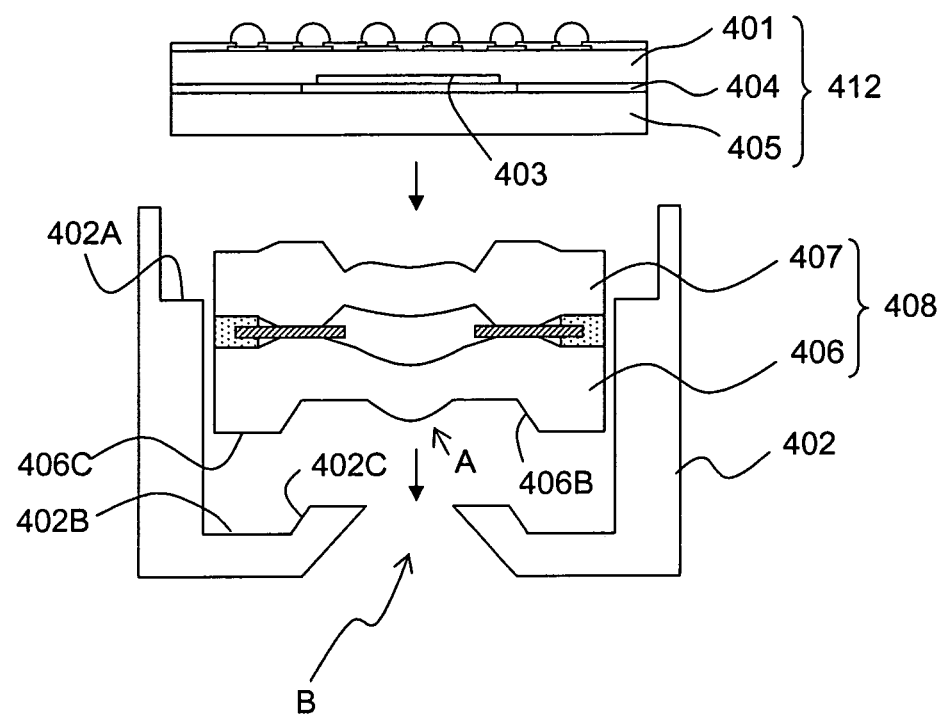
FIG. 5 is a cross sectional view of each member, illustrating an image capturing element module assembling step for housing a lens module and an image capturing element chip module within a light shielding holder.

Further, as illustrated in an image capturing element module assembling step in FIG. 5, the light shielding holder 402 is placed upside down so that the opened portion is placed upward. The lens module 408 is inserted into the light shielding holder 402 with the side of the first lens 406 facing in to engage the annular slanting surface 406B of the first lens 406 with the annular slanting surface 402C of the light shielding holder 402. Subsequently, owing to the weight of the lens module 408 itself, the annular slanting surface 406B of the first lens 406 and the annular slanting surface 402C on the inner side of the aperture opening B of the light shielding holder 402 are guided together, so that the spacer section 406C on the upper side of the first lens 406 is engaged accurately with the bottom surface section 402B of the light shielding holder 402. Further, a side wall of the lens module 408 is fixed inside the light shielding holder 402 using an adhesive or the like. Subsequently, the transparent support substrate 405 side of the image capturing element chip module 412 is placed on the step section 402A of the light shielding holder 402 and the side wall of the image capturing element chip module 412 is fixed to the light shielding holder 402 using an adhesive or the like. The adhesive fixes the side wall and the light shielding holder 402 so that the distance and horizontality are accurate between the lens module 408 and the image capturing elements. As a result, the image capturing element module 400 can be manufactured.

As described above, the manufacturing method of the image capturing element module 400 includes: a lens module assembling step and an image capturing element chip module assembling step. In the lens module assembling step, the lens module 408 is inserted from the upper first lens 406 side into the opening side of the light shielding holder 402, and owing to its weight, the annular slanting surface 406B of the upper most first lens 406 is guided to the annular slanting surface 402C on the inner side of the aperture opening B of the light shielding holder 402 to position the aperture opening B of the light shielding holder 402 and the optical surface A of the first lens 406. In the image capturing element chip module assembling step, the image capturing element chip module 412, in which the transparent support substrate 405 is adhered and fixed to cover the upper part of the image capturing element 403, is fixed inside the light shielding holder 402 by positioning the image capturing element 403 and the optical surface A. Thus, the lens or lens module 408 and the image capturing element chip module 412 are positioned and fixed inside the light shielding holder 402 to obtain the image capturing element module 400.

As described above, the lens module 408 is inserted half way through into the light shielding holder 402, which functions as a light shielding cover. Thereafter, the lens module 408 is dropped to be positioned accurately at the engaging section (annular slanting surfaces 402C and 406B) along the slanting surface. Thereafter, the image capturing element chip module 412 is mounted inside the light shielding holder 402.

Although a parts conveying device with positioning accuracy of approximately 10 μm is extremely expensive, a parts conveying device with positioning accuracy of approximately 30 μm is relatively inexpensive. Therefore, the following is possible: up to the positioning with positioning accuracy of approximately 30 μm, the lens module 408 is brought to the light shielding holder 402 to be inserted, and thereafter, the lens module 408 is dropped so that the lens module 408 can be positioned accurately along the engaging section (annular slanting surfaces 402C and 406B) of the light shielding holder 402.

Figure 10:
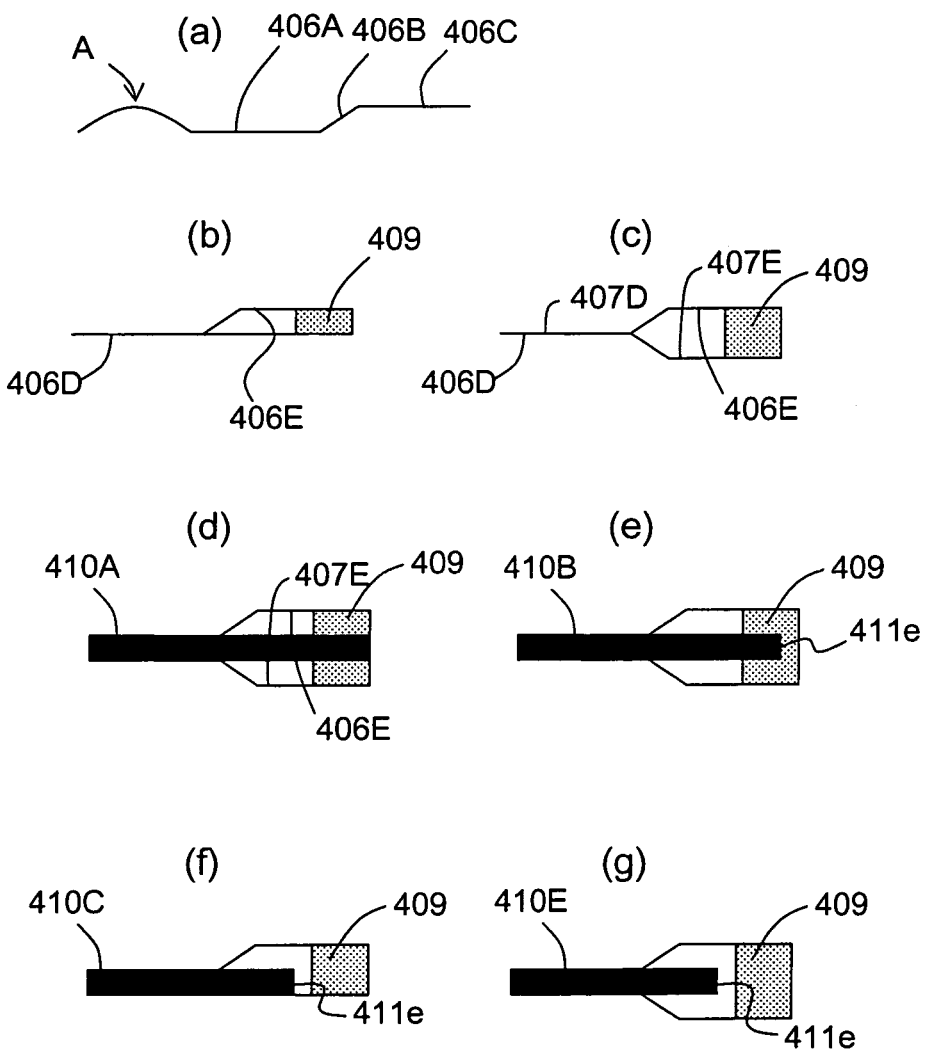
FIG. 10 is a diagram for describing a case where a spacer of a first lens does not directly contact a spacer section of a second lens, and a case where a light shielding plate wafer is not interposed directly therebetween, where FIG. 10(*a*) is an essential part cross sectional view of a front surface shape of the first lens, FIG. 10(*b*) is an essential part cross sectional view of a back surface shape thereof in a case where the first lens is fixed by an adhesive on a glass plate, FIG. 10(*c*) is an essential part cross sectional view of a joint surface of the first lens and the second lens, FIGS. 10(*d*), 10(*e*) and 10(*g*) are each an essential part cross sectional view of a joint surface in a case where a light shielding plate is directly put between the first lens and the second lens.

FIG. 10 is a diagram for describing a case where the light shielding plate wafer 411A in FIG. 9(a) is used and a case where it is not used, where FIG. 10(a) is an essential part cross sectional view of a front surface shape of the first lens 406, FIG. 10(b) is an essential part cross sectional view of a back surface shape thereof in a case where the first lens 406 is fixed by the adhesive 409 on a planarized section without a bottom section, FIG. 10(c) is an essential part cross sectional view of a joint surface of the first lens 406 and the second lens 407, FIGS. 10(d), 10(e) and 10(g) are each an essential part cross sectional view of a joint surface in a case where the light shielding plate 410 is directly put between the first lens 406 and the second lens 407, and FIG. 10(f) is an essential part cross sectional view of a joint surface in a case where the light shielding plate 410 is directly put between the first lens 406 and a planarized section without a bottom section.

FIGS. 10(b) and 10(c) illustrate a case where the light shielding plate 410 is not used. In FIG. 10(b), the spacer section 406D of the first lens 406 is directly contacting the planarized section without a bottom section to stabilize the lens space, and the adhesive 409 is arranged in a space portion of the bottom surface section 406E on the outer circumference side of the spacer section 406D. In this case, the combination of the planarized section without a bottom section and the first lens 406 includes, for example, a combination of the second lens 407 without a bottom section and the first lens 406 with a bottom section; and a combination of a transparent support body, such as a glass plate, and the first lens 406 with a bottom section, and the like.

In FIG. 10(c), the spacer section 406D of the first lens 406 is directly contacting the spacer section 407D of the second lens 407 to stabilize the lens space, and the adhesive 409 is arranged in a space portion between the bottom surface sections 406E and 407E on the outer circumference side of the spacer sections 406D and 407D.

In addition, FIGS. 10(d) to 10(g) illustrate a case where the light shielding plate 410 is used. FIG. 10(d) illustrates a case where a light shielding plate 410A extending up to the cutting position is used. FIG. 10(e) illustrates a case where a light shielding plate 410B being shorter than the light shielding plate 410A and is positioned inside the adhesive 409 (where a cut guiding hole is included). FIGS. 10(f) and 10(g) respectively illustrate cases where light shielding plates 410C and 410E, which are separated from the adhesive 409, are used.

The advantages and disadvantages of the cases illustrated in FIGS. 10(d) to 10(g) will be described hereinafter.

In FIG. 10(d), the outer circumference section of the light shielding plate 410A is extended precisely up to the cutting outer circumference, which is excellent in the light shielding effect. With regard to the cutting of the light shielding plate 410A, it is not favorable because the cutting area increases. Furthermore, since the different materials, that is, the lens and the light shielding plate 410A, are adhered with each other by the adhesive 409, there is a possibility of the adhesive 409 peeling off at the interface between the light shielding plate 410A or the lens bottom section during heat treatment of reflow, for example. In FIG. 10(e) although the light shielding effect slightly decreases since there is a gap (cut section 411e) with the light shielding plate 410B compared to the light shielding plate 410A in FIG. 10(d), the cutting area is decreased, which improves the cutting effect. It becomes difficult for the adhesive 409 to be peeled off since there is a portion where the adhesion is made between the lenses and the adhesive 409 through the gap (cut section 411e).

In FIGS. 10(f) and 10(g), although the light shielding effect is further decreased compared to the light shielding plate 410B in FIG. 10(e) since there is a large gap (cut section 411e), the cutting effect is equal and the peeling resistance effect is further improved since there are more portions where the adhesion is made only by the lenses and the adhesive 409.

An example of a case where the spacer section 406D of the first lens 406 does not directly contact the spacer section 407D of the second lens 407, and a vent hole 409A is provided during the reflow to prevent the resin from being peeled off, will be described with reference to FIGS. 11(a) to 11(d).

Figure 11:
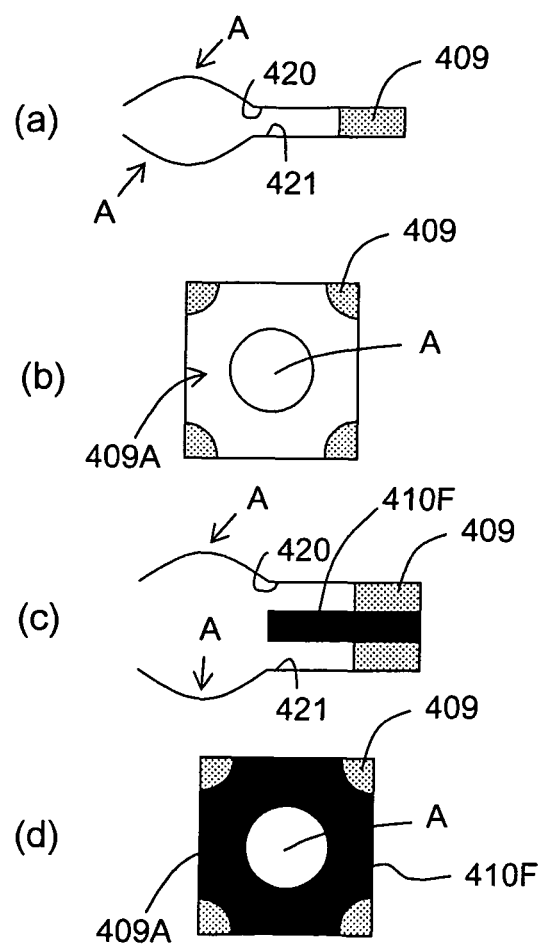
FIG. 11 is a diagram for describing a case where a light shielding plate cut from a light shielding plate wafer in FIG. 7(b) is used and a case where it is not used, where

FIG. 11 is a diagram for describing a case where the spacer section of the first lens does not directly contact the spacer section of the second lens, where FIG. 11(a) is an essential part cross sectional view of a lens joint surface of a case where a light shielding plate 410F is not used, FIG. 11(b) is a plan view thereof, FIG. 11(c) is an essential part cross sectional view of a lens joint surface of a case where the light shielding plate 410F is used, and FIG. 11(d) is a plan view thereof.

As illustrated in FIGS. 11(a) to 11(d), the adhesive 409 is arranged in a space portion surrounded by a planarized section on a further outer circumference side of a planarized surface of a spacer section 420 of the upper optical element, and a planarized section continuing on a further outer circumference side of a planarized surface of a spacer section 421 of the lower optical element. In this case, the respective planarized surfaces of the spacer section 420 of the upper optical element do not directly contact the spacer section 421 of the lower optical element.

In addition, as illustrated in FIGS. 11(c) and 11(d), of the plurality of optical elements, the light shielding plate 410F is interposed between the respective planarized surfaces of the spacer section 420 of the upper optical element and the spacer section 421 of the lower optical element. However, the light shielding plate 410F does not contact either of the spacer section 420 or 421. Instead, the light shielding plate 410F connects with the spacer sections 420 and 421 with the adhesive 409 interposed therebetween. In this case, the adhesive 409 is arranged at the position of the cut guiding hole to adhere the light shielding plate 410F and the upper and lower lenses; however, the adhesive 409 is not limited to be arranged at the position of the cut guiding hole of the light shielding plate 410F. The adhesive 409 may also be arranged between the light shielding plate 410F and the upper lens and between the light shielding plate 410F and the lower lens.

According to Embodiment 1 as described above, the upper first lens 406 and the lower second lens 407 are housed within the light shielding holder 402, and the metal light shielding plate 410 is interposed at least between the respective planarized surfaces of the spacer section 406D of the upper first lens 406 and the spacer section 407D of the lower second lens 407. The light shielding plate 410 includes the opening 411a formed at the position corresponding to the optical surface of the optical element, and includes the cut section 411e, which is formed by cutting a part of the peripheral edge of the light shielding plate 410. As described above, the metal light shielding plate 410 allows the light shielding plate 410 itself to be thin, which allows controlling the variation in a space between the lenses more favorably, and obtain more favorable optical characteristics. In addition, since the cut section 411e is included, which is formed by cutting off a part of the peripheral edge of the light shielding plate 410, the cutting area becomes less. This allows more favorable cutting during simultaneous cutting.

In addition, since the outer circumference section of the light shielding plate 410 does not reach the outer circumference ends of the first lens 406 and the second lens 407 and a gap is made by the cut section 411e, the light shielding plate 410 does not shield the UV light to the adhesive 409. As a result, it becomes possible to prevent the lenses from being deformed due to the difference in the extension between the upper and lower lenses during the conventional heat treatment. This provides dimensional stability to the overall lens module 408.

According to Embodiment 1 as described above, the spacer section 406C is provided from the planarized section 406A with the slanting surface 406B interposed therebetween, on the outer circumference side of the optical surface A of the first lens 406 facing the aperture opening B of the light shielding holder 402; on the inner surface of the back side of the aperture opening of the light shielding holder 402, the planarized bottom surface 402B is provided with the slanting surface 402C interposed, facing the slanting surface 406B of the first lens 406; and the slanting surface 406B of the first lens 406 is guided by the slanting surface 402C of the light shielding holder 402, so that the spacer section 406C is engaged with the bottom surface 402B. As described above, the annular slanting surface 406B of the first lens 406 and the annular slanting surface 402C on the inner side of the light shielding holder 402 are guided together, so that the protruded annular slanting surface is engaged with the concave annular slanting surface. As a result, the lens module 408 is moved along the engaging section of the light shielding holder 402 so as to position the aperture opening B of the light shielding holder 402 and the optical surface A of the first lens 406 with high accuracy. Thereby, it becomes possible to prevent the misalignment or tilting of the lens optical axis C of the optical surface A relative to the aperture opening B of the light shielding holder 402 and the center of the aperture opening B, and make the optical characteristics favorable.

Embodiment 2

Figure 12:
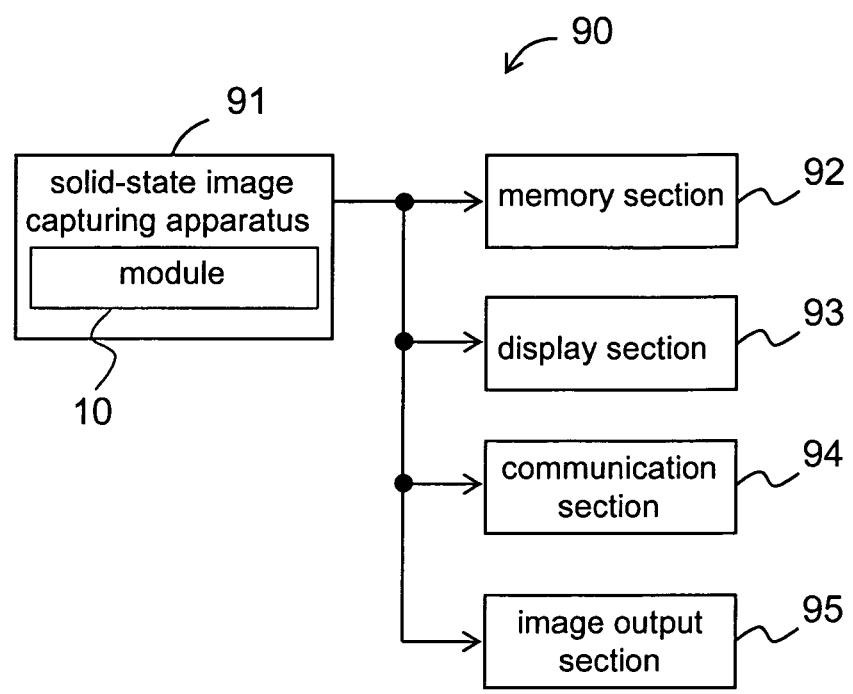
FIG. 12 is a block diagram schematically illustrating an exemplary configuration of an electronic information device of Embodiment 2 of the present invention, using a solid-state image capturing apparatus including the sensor module according to Embodiment 1 of the present invention in an image capturing section.

FIG. 12 is a block diagram schematically illustrating an exemplary configuration of an electronic information device of Embodiment 2 of the present invention, using a solid-state image capturing apparatus including the sensor module 10 according to Embodiment 1 of the present invention in an image capturing section.

In FIG. 12, an electronic information device 90 according to Embodiment 2 of the present invention includes: a solid-state image capturing apparatus 91 for performing various signal processing on an image capturing signal from the sensor module 10 according to Embodiment 1 so as to obtain a color image signal; a memory section 92 (e.g., recording media) for data-recording a color image signal from the solid-state image capturing apparatus 91 after predetermined signal processing is performed on the color image signal for recording; a display section 93 (e.g., a liquid crystal display apparatus) for displaying the color image signal from the solid-state image capturing apparatus 91 on a display screen (e.g., liquid crystal display screen) after predetermined signal processing is performed on the color image signal for display; a communication section 94 (e.g., a transmitting and receiving device) for communicating the color image signal from the solid-state image capturing apparatus 91 after predetermined signal processing is performed on the color image signal for communication; and an image output section 95 (e.g., a printer) for printing the color image signal from the solid-state image capturing apparatus 91 after predetermined signal processing is performed for printing. Without the limitation to this, the electronic information device 90 may include at least any of the memory section 92, the display section 93, the communication section 94, and the image output section 95, other than the solid-state image capturing apparatus 91.

As the electronic information device 90, an electronic device that includes an image input device is conceivable, as described above, such as a digital camera (e.g., digital video camera or digital still camera), an image input camera (e.g., a monitoring camera, a door phone camera, a camera equipped in a vehicle including a back-view monitor camera, or a camera in a television telephone), a scanner, a facsimile machine, a camera-equipped cell phone device and a personal digital assistance (PDA).

Therefore, according to Embodiment 2 of the present invention, the color image signal from the solid-state image capturing apparatus 91 can be: displayed on a display screen properly by the display section 93, printed out properly on a sheet of paper using an image output section 95, communicated properly as communication data via a wire or a radio by the communication section 94, stored properly at the memory section 92 by performing predetermined data compression processing; and various data processes can be properly performed.

Without the limitation to the electronic information device 90 according to Embodiment 2, the electronic information device may be a pick up apparatus including the electronic element module of the present invention used in an information recording and reproducing section thereof. In this case, the optical element of the pick up apparatus is an optical function element that directs output light straight to be output and refracting and guiding incident light in a predetermined direction (e.g., a hologram optical element). In addition, as the electronic element of the pick up apparatus, a light emitting element for emitting output light (e.g., a semiconductor laser element or a laser chip) and a light receiving element for receiving incident light (e.g., a photo IC) are included.

Although not specifically described in detail, for example, as a plurality of optical elements, the first lens 406 and the second lens 407 are housed within the light shielding holder 402, and the metal light shielding plate 410 is interposed at least between the respective planarized surfaces of the spacer section 406D of the upper first lens 406 and the spacer section 407D of the lower second lens 407. The light shielding plate 410 includes the opening 411a formed at the position corresponding to the optical surface A of the first lens 406 and the second lens 407, and includes the cut section 411e, which is formed by cutting a part of the peripheral edge of the light shielding plate 410. As a result, the following objective of the present invention can be achieved: when there is the light shielding plate interposed between the lenses, the light shielding plate allows controlling of the variation in a space between the lenses more favorably, and obtain more favorable optical characteristics; and more favorable cutting can be performed during simultaneous cutting.

As described above, the present invention is exemplified by the use of its preferred Embodiments 1 and 2. However, the present invention should not be interpreted solely based on Embodiments 1 and 2 described above. It is understood that the scope of the present invention should be interpreted solely based on the claims. It is also understood that those skilled in the art can implement equivalent scope of technology, based on the description of the present invention and common knowledge from the description of the detailed preferred Embodiments 1 and 2 of the present invention. Furthermore, it is understood that any patent, any patent application and any references cited in the present specification should be incorporated by reference in the present specification in the same manner as the contents are specifically described therein.

INDUSTRIAL APPLICABILITY

The present invention can be applied in the field of an optical element module, such as a lens module and an optical function element module, in which one or a plurality of optical elements are housed within a light shielding holder, and a manufacturing method thereof; an electronic element module obtained by modularizing the optical element module and an electronic element, and a manufacturing method thereof; and an electronic information device, such as a digital camera (e.g., a digital video camera or a digital still camera), an image input camera (e.g., a monitoring camera), a scanner, a facsimile machine, a television telephone device and a camera-equipped cell phone device, including the electronic element module as an image input device used in an image capturing section thereof. The annular slanting surface of the first lens and the annular slanting surface of the light shielding holder are guided together, and the protruded annular slanting surface is engaged with the concaved annular slanting surface. Therefore, it becomes possible to position, for example, the lens module consisting of the first lens and the second lens with high accuracy along the engaging section of the light shielding holder. As a result, in a case where there is a light shielding plate interposed between the lenses, it is possible to control the variation in a space between the lenses favorably and obtain favorable optical characteristics. In addition, it is possible to perform more favorable cutting during simultaneous cutting. Further, the peripheral section of the light shielding plate is formed not to reach the peripheral end of the upper optical element and the lower optical element, and a gap is created by the cut section. As a result, the light shielding plate does not shield UV light to the adhesive, which makes it possible to avoid the lenses from being deformed due to the difference in the degree of extension of the upper and lower lenses during conventional heat processing. This allows the dimensional stability of the overall lens module to be favorable. Further, it becomes possible to prevent the misalignment and tilting of the lens optical axis C relative to the aperture opening of the lens tube and the center of the aperture opening to make the optical characteristics favorable.

Various other modifications will be apparent to and can be readily made by those skilled in the art without departing from the scope and spirit of this invention. Accordingly, it is not intended that the scope of the claims appended hereto be limited to the description as set forth herein, but rather that the claims be broadly construed.

What is claimed is:

1. An optical element module, in which: a plurality of optical elements are housed within a light shielding holder; a light shielding plate is interposed at least between respective planarized surfaces of a spacer section of an upper optical element and a spacer section of a lower optical element; the light shielding plate includes an opening formed at a position corresponding to an optical surface of the optical element; and the light shielding plate includes a cut section, which is formed by cutting off a part of the light shielding plate,
   wherein an adhesive is disposed in the cut section,
   the upper optical element and the lower optical element are adhered with the adhesive via the cut section, and
   the light shielding holder is not adhered.

2. An optical element module according to claim 1, wherein the cut section at the four corner portions is either in a ¼ circular shape, or in an L shape along the corner portion.

3. An optical element module according to claim 1, wherein the light shielding plate is made of metal.

4. An optical element module according to claim 3, wherein a thickness of the light shielding plate is defined to be 100 μm at its maximum.

5. An optical element module according to claim 1, wherein: a spacer section is provided on the outer circumference side of the optical surface of the optical element facing an aperture opening of the light shielding holder, with an annular slanting surface interposed from a planarized section; a planarized bottom surface is provided on an inner surface of a back side of the aperture opening of the light shielding holder, with an interposed slanting surface facing the slanting surface of the optical element; and the respective annular slanting surfaces of the optical element and the light shielding holder can be guided together.

6. An optical element module according to claim 5, wherein the annular slanting surface of the optical element and the annular slanting surface of the light shielding holder slant 30 to 80 degrees relative to the planarized surface.

7. An optical element module according to claim 5, wherein there is a gap of 30 μm to 100 μm between an inner surface of the light shielding holder and an outer surface of the one or plurality of optical elements, which are quadrilateral in plan view.

8. An optical element module according to claim 5, wherein the gap between the annular slanting surface of the optical element and the annular slanting surface of the light shielding holder is 20 μm at its maximum.

9. An optical element module according to claim 1, wherein an adhesive is arranged only in a space portion surrounded by bottom sections provided, with interposed taper sections, on a further outer circumference side of respective planarized surfaces of the spacer section on the outer circumference side of the optical surface on a back surface of the upper optical element, and a spacer section on the outer circumference side of the optical surface on a front surface of the lower optical element, so that the upper optical element and the lower optical element are adhered with each other.

10. An optical element module according to claim 9, wherein: the adhesive is arranged only in the space portion surrounded by the bottom sections with the interposed taper sections; the adhesive is not arranged at least in a space portion surrounded by the upper and lower taper sections; and at least the space portion surrounded by the taper sections has enough space which prevents the adhesive from spreading to the spacer section by being pressed by the upper optical element and the lower optical element during adhesion.

11. An optical element module according to claim 1, wherein the adhesive is an ultraviolet ray (UV) curing resin or an ultraviolet ray (UV) curing and thermosetting resin.

12. An optical element module according to claim 1, wherein the optical surface, the slanting surface on the outer circumference side thereof, and the spacer section are simultaneously formed with a transparent resin material.

13. An optical element module according to claim 1, wherein the optical element is a lens.

14. An optical element module according to claim 1, wherein the optical element is an optical function element that directs output light straight to be output and refracting and guiding incident light in a predetermined direction.

15. A method for manufacturing an optical element module according to claim 1, the method comprising an assembling step, in which an optical element module is inserted into an open side of the light shielding holder, from the side close to the upper most optical element of the optical element module, and owing to a weight of the optical element module itself, a slanting surface of the uppermost optical element and a slanting surface on an inner side of an aperture opening of the light shielding holder are guided together, so that the aperture opening of the light shielding holder and the optical surface of the optical element are positioned.

16. A method for manufacturing an optical element module according to claim 15, the method further including, preceding prior to the assembling step:
   a combining step for combing, by an adhesive, an upper lens wafer with a plurality of optical surfaces arranged thereon two dimensionally and a lower lens wafer with a plurality of optical surfaces arranged thereon in two dimensionally, with a light shielding plate wafer interposed therebetween, in such a manner that optical axes of the upper and lower optical surfaces correspond to openings of the light shielding plate wafer, to manufacture an optical element wafer module;
   a UV light emitting step of emitting UV light onto the adhesive to cure the adhesive; and
   a cutting step of cutting the optical element wafer module simultaneously along dicing lines into individualized optical element modules.

17. An electronic element module, in which an image capturing element chip module is fixed in a light shielding holder of the optical element module according to claim 1, the image capturing element chip module including a transparent support substrate adhered and fixed thereto to cover an electronic element facing the optical surface of the optical element, and the image capturing element chip module being adhered by positioning the electronic element relative to the optical surface.

18. A method for manufacturing an electronic element module, the method comprising:
   an optical element module assembling step using the method for manufacturing an optical element module according to claim 15; and
   an electronic element chip module assembling step of fixing an electronic element chip module including a transparent support substrate adhered and fixed thereto for covering the electronic element facing the optical surface of the optical element, within the light shielding holder by positioning the electronic element relative to the optical surface.

19. An electronic information device including an electronic element module, as a sensor module, in an image capturing section thereof, the electronic element module including the optical element module according to claim 13 provided therefor.

20. An electronic information device including an electronic element module in an information recording and reproducing section thereof, the electronic element module including the optical element module according to claim 14 provided therefor.

21. An optical element module according to claim 1, wherein the upper optical element and the lower optical element are adhered with the adhesive so as not to contact the cut section.

\* \* \* \* \*